July 18, 1933.   J. R. HOFFMAN   1,918,645
HAND TOOL
Filed July 1, 1931
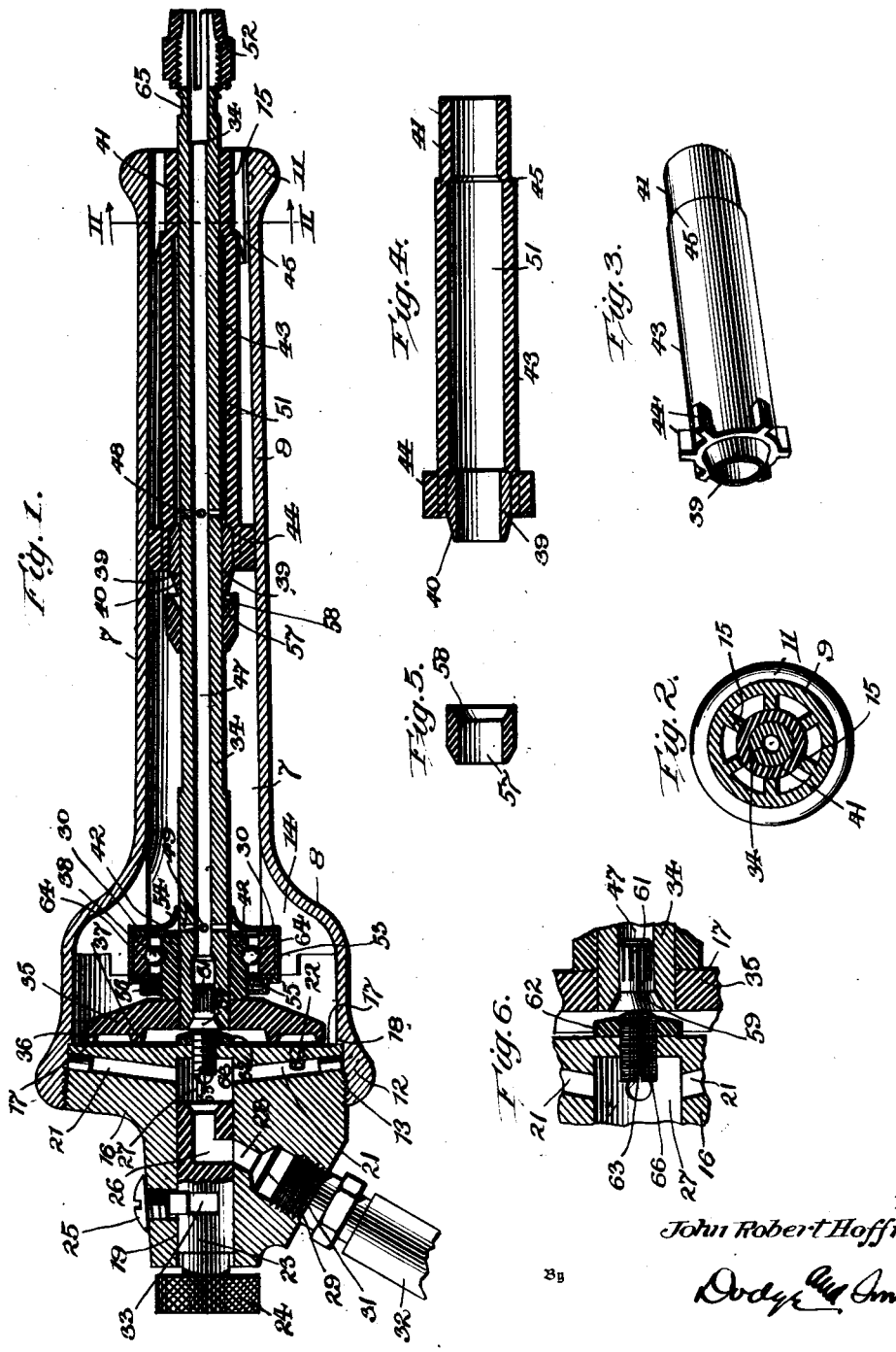
Inventor
John Robert Hoffman
By
Dodge
Attorneys Patented July 18, 1933

1,918,645

UNITED STATES PATENT OFFICE

JOHN R. HOFFMAN, OF MADISON, WISCONSIN, ASSIGNOR TO MADISON-KIPP CORPORATION, OF MADISON, WISCONSIN, A CORPORATION OF WISCONSIN

HAND TOOL

Application filed July 1, 1931. Serial No. 548,245.

This invention relates to hand tools and particularly to tools adapted to be driven by fluid pressure.

Among the advantages of tools embodying this invention may be named, the provision of means for adjusting the rotor operating clearances; means whereby the bearings are cooled by the escaping pressure fluid, but such fluid is prevented from reaching the bearing surfaces and blowing the lubricant away; and means for centrifugally supplying lubricant to the bearings.

Other advantages of the invention will appear from the following description when read in connection with the accompanying drawing, in which,—

Fig. 1 is a longitudinal section of one form of fluid pressure operated tool embodying this invention;

Fig. 2 is a section on line II—II of Fig. 1;

Fig. 3 is a perspective view of a combined lubricating and bearing sleeve for supporting the rotor shaft;

Fig. 4 is a longitudinal section of the sleeve shown in Fig. 3;

Fig. 5 is a detailed sectional view of an air deflector which functions to prevent pressure fluid from reaching the forward bearing surfaces of the rotor shaft; and Fig. 6 is an enlarged sectional detail showing one form of adjustable thrust bearing suitable for use in connection with the rotor shaft.

Referring to the drawing, the reference character 7 designates generally the tool casing, and is made up of a head portion 8 and a barrel portion 9. The head portion 8 terminates in a beaded end 12 threaded interiorly at 13. The barrel 9, in turn, terminates in a beaded end 11.

Inside of the head portion 8, and preferably integrally formed therewith, are a plurality of spaced radial ribs 14 which join with this head portion at the point where it merges into the barrel portion 9. The forward end of the casing carries a similar set of radial ribs 15, both of these sets of ribs being formed to receive and support rotor bearings and to maintain them in axial alignment with the casing.

Threaded into the head portion 8 at the open end thereof, is a closure 16 having a substantially flat front portion 17 which abuts against a shoulder 18 inside of bead 12 to limit the inward movement of this closure. The closure contains an axial bore 19, terminating at its forward end in a plurality of radial ducts 21 extending outwardly at equally spaced intervals, and these ducts 21, in turn, terminate in ports 22 in the face 17 of the closure 16.

Rotatably mounted in the bore 19, is a fluid pressure control valve 23 having an external handle 24, and limited in its movement by an adjustable stop screw 25. The valve 23 contains an internal chamber 26 communicating at the forward end with a chamber 27 connected with ducts 21, and laterally of the valve with an inlet duct 28. This duct 28 is restricted at the point where it cooperates with chamber 26, but supports in its main bore a suitable fluid strainer 29 and a threaded nipple 31, to which a suitable hose 32 may be attached. Movement of the valve 23 is limited in both directions by the engagement of screw 25 with the ends of a groove 33 in the stem of valve 23.

When the handle 24 occupies the position shown, stop 25 engages one end of groove 33, and duct 28 is in direct communication with chambers 26 and 27, so that pressure fluid may be delivered to the radial ducts 21. When, however, the handle 24 is rotated to its opposite position, so that stop screw 25 engages the other end of groove 33, the duct 28 is blanked by the stem of valve 23, and entrance of pressure fluid to the chambers 26 and 27 is entirely cut off. It will be obvious that by a suitable regulation of handle 24, the valve 23 may be moved to intermediate positions in which varying amounts of pressure fluid are supplied to the chamber 27.

Rotatably mounted inside of head 8 is a rotor comprising a longitudinal shaft 34, and a turbine runner 35. The runner 35 has a plurality of radial buckets connecting flanges 36 and 37 on its face, and the buckets are operatively related to the ports 22 in closure 16. The clearances between the faces of flanges 36 and 37 and the face 17 of closure 16, are such that pressure fluid is prevented from escaping inwardly, but is allowed to escape outwardly from the runner buckets into the chamber inside of head 8, after it has exhausted a substantial portion of its kinetic energy in actuating the runner. No claim to this structure is made herein, since it forms the subject matter of and is claimed in a copending application of Axel Pedersen, Ser. No. 563,202, filed September 16, 1931, and entitled "Pressure fluid tools".

The shaft 34, in turn, is rotatably mounted in bearings 38, 39 and 41, the rear end of this shaft carrying an inner ball race 42. The bearings 38 cooperate with inner ball race 42 and an outer race 64, the latter being supported in cut-out portions 30 inside of ribs 14.

The two forward bearings for the shaft 34 are made up of a single sleeve member 43, having a hollow central portion, and reduced bearing sleeves 41 and 39 at its front and rear ends, respectively. The sleeve 43 has a plurality of projecting lugs 44 adapted to fit, at their periphery, into close engagement with the inside of barrel 9, so as to centralize the bearings 39 and 41 and hold them in rigid relation to the casing of the tool. The sleeve 43 is inserted in place from the rear of the casing 7 when closure 16 is removed, and is driven to the position which it occupies in Fig. 1, until a shoulder 45 abuts against a cooperating shoulder on each of the ribs 15. As here shown, the bearing sleeve 39 is indicated as being separate from the sleeve 43, but it is obvious that if desired it may be integral therewith.

The shaft 34 is split at its forward end and threaded to receive a nut, thereby forming a chuck or tool-holding collet 52. It is also flattened at 65 to receive a wrench when a tool is being clamped into the chuck.

The bearings 39 and 41 are adapted to contact with the shaft 34, but the central portion inside of sleeve 43 between these bearings is of larger diameter than both the bearings and the shaft, so as to form a lubricating chamber 51.

The lubricating feature of this tool is very important, because the tool operates at extremely high speed where a failure of lubrication would cause serious damage to the operating parts. It is for this reason that the shaft 34 is formed with a chamber 47 extending throughout its length, and that it contains two sets of radial lubricating ducts 48 and 49 communicating with this chamber 47.

The rear set of ducts 49 is adapted to supply oil from chamber 47 to the ball bearing 38, the supply being controlled by centrifugal force acting upon the lubricant in this chamber when the tool is operating. In similar manner, lubricant is supplied from chamber 47 through ducts 48 to the chamber 51 formed inside of sleeve 43, and thence to bearings 39 and 41. Lubricant is supplied to the chamber 47 from the front end of shaft 34 inside of the chuck 52.

Because of the high speed of operation of this tool, it is essential that the bearings be cool and that the pressure fluid be entirely excluded from them so as to prevent the lubricant from being blown away. For this reason, the rear ball bearing 38 is protected by air deflecting washers 53 and 54. Washer 53 fits around the bearing at the rear and inside of the recesses 30 in the ribs 14, and preferably contains an additional inner washer 55, as well as a felt packing 56. The forward end of washer 54 is drawn out and brought into close contact with the shaft 34 to prevent lubricant from escaping.

Air is prevented from entering the two front bearings of the tool by an air deflector 57 driven onto the shaft 34 in closely contacting relation therewith, and preferably slightly overlapping the rear end of bearing sleeve 39. For this purpose, the sleeve 39 is tapered at 40 and the surface 40 cooperates with a similar interior surface 58 on sleeve 57, the front and rear surfaces of this deflector sleeve being substantially parallel. With the deflector sleeve constructed in this manner, an effective stream-line effect is produced, so that pressure fluid is positively prevented from entering the bearing surfaces 39 and 41 and escapes between the lugs 44 and the ribs 14 at the front end of the tool adjacent to chuck 52.

The rear end of chamber 47 is closed by a rivet 59 having a flared head cooperating with the countersunk end of shaft 34, and a ribbed portion 61 which fits tightly within the open end of chamber 47, so as to seal it effectively when the rivet is driven into place. The head of this rivet is preferably hardened so as to cooperate with the hardened end of an adjustable thrust screw 66. Screw 66 is threaded through the face 17 of closure 16 and is accessible from chamber 27 when the valve 23 is removed. The thrust screw 66 may be locked in position by a lock nut 62, which engages face 17 adjacent the turbine runner, and when this nut is loosened, the screw may be adjusted by the use of a screw driver slot 63. It will be obvious that by movement of this thrust screw and suitable adjustment of lock nut 62, the clearances between the parts may be adjusted to any desired value.

The operation of the tool is as follows: Assuming that the three bearings have been lubricated by placing a supply of thin lubricant in chamber 47, a source of pressure fluid connected to hose 32, and that a suitable tool has been inserted in chuck 52, the valve 23 is moved to the position shown in Fig. 1 of the drawing. Pressure fluid then passes through chambers 26 and 27, to ducts 21, and escapes from ports 22, striking the blades of runner 35, and setting the rotor in motion.

The entrance of fluid into the central space in the rear of runner 35 is blocked by flange 37, hence it escapes over flange 36 into the chamber in head 8, and then passes over and into cooling contact with the outside of bearings 38 and the deflectors 53 and 54. The escaping fluid divides into several small streams which enter barrel 9 between ribs 14, over deflector 57, between lugs 44, in cooling contact with bearing 39, sleeve 43 and bearing 41, and thence escaping adjacent the chuck 52.

Rotation of shaft 34 causes the lubricant in chamber 47 to be thrown outwardly through ducts 48 into chamber 51 and around bearings 39 and 41, and also through ducts 49 around bearings 38. The exhaust fluid bathes all three bearings as well as sleeve 43 in a cooling bath, thereby absorbing and carrying away heat generated in the bearings and cooling both the bearings and the lubricant. The entire volume of exhaust fluid, therefore, acts to cool the bearings and then in escaping adjacent the chuck 52, blows away chips and dust produced by the cutting tool.

Not only is the temperature of the bearings maintained at a satisfactory value, and a continuous supply of lubricant to the bearings insured by this arrangement, but the bearings are positively sealed against pressure fluid so as to prevent the lubricant from being blown out. The adjustment of the rotor can be varied to give proper operating clearances, and play and vibration reduced to a minimum.

Proper adjustment of the rotor results in very quiet operation of the tool, while the dividing of the escaping fluid into small streams between ribs 14 and 15, prevents excessive disturbance by the exhaust fluid and a special muffling device is rendered unnecessary.

The operation of the tool at high speeds necessitates adequate bearing suspension, and this support is provided at three spaced points, thereby avoiding harmful deflection of the shaft 34, and preventing friction in the bearings by misalignment. When the tool is operating without load, the shaft is supported by bearings 38, 39 and 41, the thrust bearing being ineffective. When, however, the tool in chuck 52 is brought to bear against the work, the thrust exerted by the shaft is taken up between the screw 66 and head 59.

The structure described is capable of operating for long periods at extremely high speeds without any of the parts becoming overheated, and proper temperature and proper lubrication of the parts is assured at all times.

The general subject matter of this application and embodying a fluid pressure operated tool comprising a two-part casing in one part of which a turbine rotor is mounted, is disclosed and claimed broadly in my copending application Ser. No. 419,417, filed January 8, 1930.

Although a preferred embodiment of the invention is herein shown and described, it will be obvious that changes may be made in the details, within the scope of the claims without departing from the spirit and scope of the invention.

What is claimed is:

1. A hand tool comprising a hollow casing; front and rear bearings supported by said casing; a rotor carried in said bearings; means for supplying pressure fluid into said casing to actuate said rotor; means for centrifugally supplying lubricant to said bearings; and individual air deflecting members associated with each of said bearings for preventing the exhaust fluid from passing through the bearings to blow the lubricant therefrom.

2. A hand tool comprising a hollow casing; means for supplying pressure fluid to said casing; a rotor disposed in said casing in operative relation to the pressure fluid inlet and adapted to be actuated by said fluid; front and rear bearings for said rotor disposed in the casing in the path of fluid exhausted from said rotor; and individual members associated with each of the bearings for preventing said fluid from passing through them.

3. A hand tool comprising a two-part casing one part of which forms a closure; a rotor disposed in said casing; means for supplying actuating fluid to said rotor to operate it; an adjustable thrust bearing between said rotor and said closure, said bearing being carried by said closure for adjusting the clearance between them; and means inside of said casing for locking the bearing in adjusted position.

4. A portable tool comprising a hollow casing; a closure for said casing; a rotor, including a runner and a shaft rotatably mounted in said casing; pressure fluid controlling and directing means in said closure in alignment with said runner; a thrust bearing surface on the end of said shaft adjacent said closure; an adjustable bearing screw carried by said closure and contacting with the bearing surface on the shaft to adjust the clearance between said runner and said closure; and means inside of the casing for locking said screw in adjusted position.

5. A hand tool comprising a casing; a lubricating sleeve removably mounted in said casing, said sleeve having a bearing near each end, a pronged positioning member adjacent one end and a centrally relieved portion forming a lubricant chamber; a rotor mounted in said bearings, said rotor including a shaft having a lubricant chamber therein; radial ducts in said shaft connecting the lubricant chamber therein with the relieved portion of said sleeve; and means for actuating the rotor to subject the lubricant in the chamber in the shaft to centrifugal action.

6. A hand tool comprising a casing; a shaft in said casing; a runner on said shaft; means for supplying pressure fluid to said casing and directing it in a forward direction against said runner; three bearings for said shaft, disposed forwardly of said runner; a single sleeve supporting two of said bearings and constructed to form fluid discharge channels outside of the sleeve when the sleeve is in the casing; and fluid deflecting means on said shaft in rear of said bearing sleeve for deflecting the exhaust fluid from said two bearings.

7. A hand tool comprising a casing; bearings in the front and rear of said casing; a shaft mounted in said bearings; a runner on said shaft in rear of said bearings; means for supplying pressure fluid to said casing to actuate said runner; means for lubricating said bearings; means for preventing exhaust fluid from blowing lubricant from the rear bearing; and separate fluid deflecting means on said shaft between said bearings for deflecting air from and preventing it from passing through the front bearings.

8. A hand tool comprising a casing having a large end and a small end, each having spaced radial bearing supporting ribs on the inside thereof; a rotor disposed in said casing, and including a turbine runner located in the large end of the casing; means for supplying pressure fluid to the large end of said casing into operative relation with said runner, whence it is discharged through the small end of the casing; a plurality of bearings for supporting said rotor, one of said bearings being mounted adjacent the small end of the casing and supported by said ribs so as to be continuously bathed in the exhaust fluid escaping from said runner; and means for preventing the fluid exhausted from said runner from passing in contact with the bearing surfaces.

JOHN R. HOFFMAN.